(12) United States Patent
Tippelt

(10) Patent No.: US 8,571,746 B2
(45) Date of Patent: Oct. 29, 2013

(54) CONTROL SYSTEM

(75) Inventor: Wolf-Torsten Tippelt, Stuttgart (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1248 days.

(21) Appl. No.: 11/433,055

(22) Filed: May 12, 2006

(65) Prior Publication Data

US 2007/0013545 A1    Jan. 18, 2007

(30) Foreign Application Priority Data

May 12, 2005 (EP) .................................. 05010295

(51) Int. Cl.
*G06F 19/00* (2011.01)
*G05B 19/00* (2006.01)

(52) U.S. Cl.
USPC ............ 701/29; 307/10.2; 73/146.2; 73/1.57; 73/146.5; 340/10.34; 382/105

(58) Field of Classification Search
USPC .................. 701/29; 307/10.2; 73/146.2, 1.57, 73/146.5; 340/10.34; 382/105
See application file for complete search history.

(56) References Cited

U.S. PATENT DOCUMENTS

| | | | | |
|---|---|---|---|---|
| 3,705,385 A | * | 12/1972 | Batz | 340/870.02 |
| 5,198,826 A | * | 3/1993 | Ito | 343/726 |
| 6,647,773 B2 | * | 11/2003 | Nantz et al. | 73/146.5 |
| 6,745,624 B2 | * | 6/2004 | Porter et al. | 73/146.2 |
| 6,894,600 B2 | * | 5/2005 | Phelan | 340/10.34 |
| 6,945,087 B2 | * | 9/2005 | Porter et al. | 73/1.57 |
| 7,009,860 B2 | * | 3/2006 | Kazutoshi | 363/98 |
| 7,049,709 B2 | * | 5/2006 | Boggs | 307/10.2 |
| 2003/0095688 A1 | * | 5/2003 | Kirmuss | 382/105 |
| 2004/0098179 A1 | * | 5/2004 | Sokoloski et al. | 701/29 |

* cited by examiner

*Primary Examiner* — Ronnie Mancho
(74) *Attorney, Agent, or Firm* — Brinks Hofer Gilson & Lione

(57) ABSTRACT

A control system is provided for controlling an electronic device. The control system includes a control apparatus and a processing device. The control apparatus includes a transponder and a coupling unit. The transponder of the control apparatus may be configured to receive an activation signal and transmit a control signal to the processing device. The coupling unit may be configured to enable and disable transmission of the control signal to the processing device. The processing device may be configured to receive the control signal and communicate the control signal to an electronic device or utilize the control signal to control the electronic device.

36 Claims, 4 Drawing Sheets

CONTROL SYSTEM

RELATED APPLICATIONS

This application claims priority of European Patent Application Ser. No. 05 010 295.3, filed May 12, 2005, titled APPARATUS AND METHOD FOR REMOTE CONTROL OF AN ELECTRONIC DEVICE, which is incorporated by reference in this application in its entirety.

BACKGROUND

1. Field of the Invention

The present invention relates to the field of control systems. In particular, the present invention relates to a control system for controlling an electronic device mounted inside a vehicle (e.g., in the vehicle compartment), such as a built-in infotainment system.

2. Related Art

Various types of electronic control devices are known, including such devices for mounting in the passenger compartments of vehicles. Some electronic control devices have been configured to control on-board vehicle sound systems and navigation systems. Electronic control devices adapted for mounting in vehicles have included buttons located in operation panels arranged on the exterior housings of the respective electronic devices. Some electronic control devices have been implemented separately from such exterior housings, often located within the reach of the driver or a passenger, for operation of the electronic devices. Some of such electronic control devices have been integrated into the steering wheel or dashboard of a vehicle, for convenient operation by the driver. Often these electronic control devices are connected by cables of the vehicle wire harness to the electronic devices to be controlled.

Remote control devices, including such devices for utilization in vehicles, are also known. Efficient control of on-board vehicle systems is important for a variety of reasons, including the need to maximize the driver's attentiveness to driving hazards, as well as the benefits of driver satisfaction with the vehicle.

Despite the many advances that have been made in design of control system for electronic systems, such control systems generate continuing problems for users. As an example, such apparatus configured as controllers for vehicular electronic systems may give rise to problems for vehicle drivers. Remote control apparatus that transmit a wireless signal such as an infrared signal often include storage batteries in the housings of the apparatus, for power supply. These storage batteries contribute to the minimum sizes and weights of the remote control system, and necessitate periodic maintenance including replacement of discharged batteries. The battery weight, the inevitability of battery failure, and the inconvenience of obtaining and installing a replacement battery, are annoyances to the driver.

Speech recognition systems are examples of alternative devices for remote, wireless transmission of control signals to an electronic device. Speech recognition systems may not require an integrated storage battery nor a large sized or heavy control instruction input device. Instead, activation of speech recognition systems may merely require a microphone that is connected to a speech recognition unit. The utilization of speech recognition systems for control of electronic systems nevertheless requires a speech recognition unit that may be integrated into the electronic device or into a separate electronic unit. Fabrication of such speech recognition units may represent a significant addition to the manufacturing cost and design complexity of such a control system for electronic devices. Moreover, utilization of a speech recognition system for vehicular electronic device control depends on the quality of speech recognition offered by such a speech recognition system. Fallibility and inaccuracy in such speech recognition in the case of an on-board vehicular system may render difficult the precise control of various functions of a vehicular electronic device while a vehicle is being driven. As a result, electronic device operation may either not be accurately fulfilled, or not fulfilled at all as the driver attends to driving. Difficulties in achieving recognition of the driver's spoken commands to the speech recognition unit may detract from the driver's attention to driving the vehicle. Undue driver preoccupation with these problems in the operation of the electronic device may thus compromise driving safety including the driver's attention to surrounding traffic situations.

Accordingly, a continuing need exists for new electronic control devices, including such devices that are mountable in the passenger compartments of vehicles to control electronic devices mounted in vehicles.

SUMMARY

A control system for controlling an electronic device is provided. The control system may include a control apparatus and a processing device. The processing device serves to receive control signals from the control apparatus and transmits the received control signal to the electronic device. The control apparatus, which may be in the form of a remote control device, may include a transponder and a coupling unit. The transponder may be configured to receive an activation signal from the processing device and transmit a control signal to processing device. The coupling unit may be configured to enable and disable transmission of the control signal.

In operation, the control system may operate in accordance with the following example method, which may include the steps of: (i) powering the control apparatus; (ii) enabling the control apparatus; (iii) transmitting a control signal to the electronic device utilizing a transponder; and (iv) terminating the transmission of the control signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

FIGS. 1-5 illustrate examples of a control system and an example method of operation of the control system. As further illustrated below, the control system may include a transponder having a signal transmission unit, for transmission of a control signal to a remote electronic device. While the control system of the invention is described as a control system for controlling a vehicular electronic system, such as a navigation system, it is understood that such control system as disclosed throughout this specification may be configured for control of non-vehicular electronic systems. At the same time, it is further understood that the control system disclosed in this specification may be configured specifically to address problems with conventional on-board control systems for vehicles.

Figure 1:
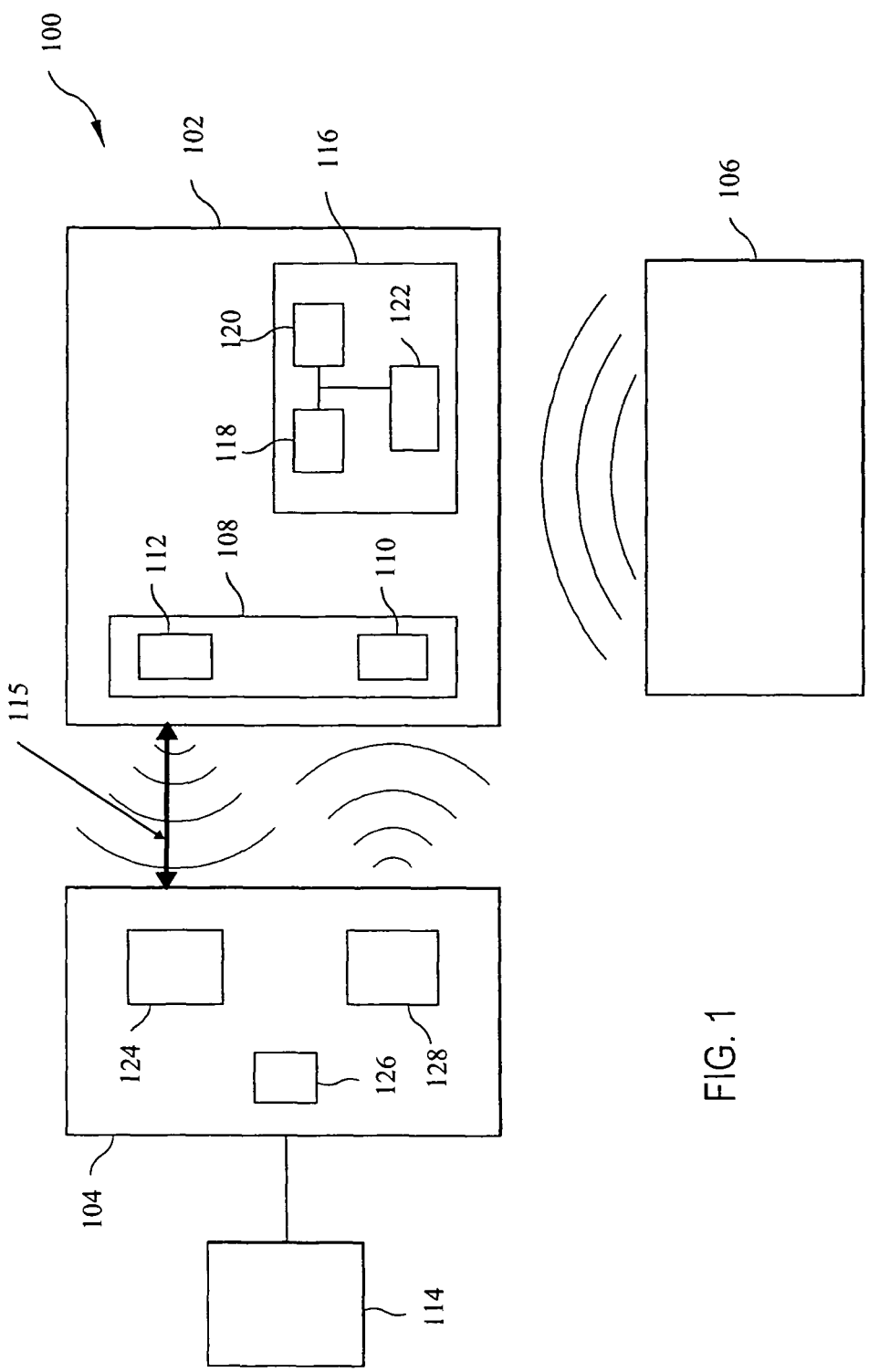
FIG. 1 is a schematic block diagram showing an example of one implementation of a control system.

FIG. 1 is a schematic block diagram showing one example of an implementation of a control system 100. As illustrated in FIG. 1, the control system 100 may include a control apparatus 102, a processing device 104 and an energy supply device 106. The control apparatus 102 may be in signal communication with a processing device 104 that is able to communicate control signals to an on-board vehicle electronic system, such as a navigation system or infotainment system. Although FIG. 1 illustrates the energy supply device 106 as an external supply device 106, the energy supply device 106 may be integrated into the control system 100.

The control apparatus 102 may include a transponder 108. The transponder 108 may include a signal receiving unit 110 configured to receive an activation signal, which may be transmitted from the processing device 104. The transponder 108 may also include a response signal transmission unit 112 configured to transmit a response or control signal to the processing device 104. In one example of an implementation of the remote control system, the response signal may be transmitted via a Bluetooth® format (Bluetooth® is a registered trademark of Bluetooth Sig, Inc.) or other format utilized to transmitting signals, such a RF. The response signal constitutes a control signal for controlling an electronic device 114, and may be generated in response to the activation signal received from the processing device 104. The transponder 108 may also include an electronic data-carrying device (not shown) that stores data regarding the response signal, such as a microchip, for example. In an example of an implementation of the transponder 108, the signal receiving unit 110, the response signal transmission unit 112, and the electronic data-carrying device may be integrated together and mounted on a substrate such as a thin film substrate.

As used in this application, the term "transponder" refers to a communication device that receives an electromagnetic radiation signal at a selected input frequency or frequency range, and then sends a wireless output signal at a selected output signal frequency or frequency range. A transponder may include an antenna for sending and receiving signals, and an electronic data-carrying device that stores data regarding the signals to be sent.

In one example of an implementation, the transponder 108 may be a passive transponder without an internal power supply 106. As an example, the transponder 108 may be a radio frequency identification tag ("RFID"). RFID tags may have small sizes and may be manufactured in large volumes. An RFID tag may include a microchip and an antenna printed by a thin film technique, commonly referred to as a "smart tag".

In one example, the control apparatus 102 may not operate utilizing an internal power supply, but may instead derive its power supply from and external energy supply device 106. Accordingly, the control apparatus 102 may not include a storage battery for example, which reduces the resultant minimum weight and size of the control apparatus 102.

As examples, the transponder 108 to be included in the control system 100 may have an operating frequency or frequency range selected in dependence on a maximum expected distance represented by the arrow 115 at which the control apparatus 102 and the processing device 104 may be separated from each other during utilization. In one example of an implementation, microwave frequencies or ultra-high frequencies ("UHF") may be utilized by the transponder 108. For example, "remote coupling" transponders may be selected for utilization in the control system 100 where the maximum expected distance between the control apparatus 102 and the processing device 104 is about one meter or less. Remote coupling transponders may operate, as examples, at frequencies of about 100-135 kilohertz ("KHz"), about 6.75 megahertz ("MHz"), about 13.56 MHz, or about 27.125 MHz.

As another example of an implementation, long range transponders may be selected for utilization in the control system 100 where the maximum expected distance between the control apparatus 102 and the processing device 104 is up to about 10 meters. Long range transponders may operate, as examples, at frequencies of about 915 MHz, 2.45 GHz, 5.8 GHz, and 24.125 GHz, for example. Utilizing long range transponders having operating frequencies above 30 MHZ as an example, facilitates incorporation of transponder antennas having relatively smaller dimensions and greater efficiency than may be possible using transponders operating at frequency ranges below 30 MHz. In another example of an implementation, transponders having operating frequencies greater than, less than, or overlapping with 30 MHZ may be utilized.

The control apparatus 102 may further include a coupling unit 116 configured to control the wireless supply of power, by inductive or electrical coupling, from the energy supply device 106 to either the signal receiving unit 110, or to the response signal transmission unit 112, or to both of such units 110 and 112. The coupling unit 116 may include a disabling unit 118 and an enabling unit 120. The disabling unit 118 serves to disable the control signal transmission by the response signal transmission unit 112. The enabling unit 120 serves to re-enable control signal transmission by the response signal transmission unit 112 after transmission has been disabled by the disabling unit 118. The coupling unit 116 may further include an input device 122 arranged for operation by a vehicle driver, configured to activate the disabling unit 118 and the enabling unit 120. Remote operation of the disabling unit 118 and enabling unit 120 of the signal transmission unit 112 by a vehicle driver, as an example, facilitates remote control of vehicular systems without the requirement of a battery powered remote controller or a speech recognition unit.

The disabling unit 118 and the enabling unit 120 may constitute separate components of the coupling unit 116. Alternatively, the disabling and enabling functions of the disabling unit 118 and the enabling unit 120, respectively, may be integrated to form a unitary enabler-disabler (not shown). In a further implementation, the enabler-disabler may be integral with the input device 122. In an implementation, the enabler-disabler may include a switch (not shown) configured to open and close the voltage supply of an electrical circuit of the control apparatus 102. The disabling unit 118 and the enabling unit 120 may, as shown in FIG. 1, be integral with the coupling unit 116. As another example, the disabling unit 118 and the enabling unit 120 may not be integrated in the coupling unit 116. In an implementation, the disabling unit 118 and the enabling unit 120 may be located at or integrated with response signal transmission unit 112.

The processing device 104 may receive control signals from the control apparatus 102 at a control signal receiving unit 124. The processing device 104 may then communicate the received control signals to a control unit 126. The control unit 126 may then communicate the control signal to the electronic device 114 to be controlled, to which the processing device 104 including the control unit 126 may be connected. In one implementation, the processing device 104 may include an activation signal transmission unit 128. As an example, a signal may be received by the signal receiving unit 110 from the activation signal transmission unit 128 once the enabling unit 120 is activated. In another example, the processing device 104 may not be an integral device. In another implementation, one or all of an activation signal transmission unit 128, a control signal receiving unit 124, and a control unit 126 may take the form of separate units that may be in communication with each other by wire or wireless technology.

The energy supply device 106, when used as and external power supply, may, for example, generate an electromagnetic field for supplying radiation energy to the control apparatus 102 by electrical or inductive coupling. As a further example, the activation signal transmission unit 128 may also serve the function of the energy supply device 106 as defined above, and the energy supply device 106 may be omitted. In another example of an implementation, such a configuration for the control system 100 may facilitate compact integration of the components of the apparatus into a vehicle.

The radiation energy emitted by the energy supply device 106 may be received and utilized by the signal receiving unit 110 and the response signal transmission unit 112 as controlled by the coupling unit 116, as power supply for the components of the control apparatus 102 earlier discussed. As examples, the energy emitted by the energy supply device 106 may supply power to the transponder 108 including the response signal transmission unit 112 or the signal receiving unit 110 or both. In another implementation, the energy supply device 106 may provide radiation energy for enabling or disabling the coupling unit 116 of the control apparatus 102.

In another implementation, the transponder 108 may be an active transponder having an internal power supply source (not shown) for voltage supply of an electronic data-carrying device (not shown). The internal power supply source may be a storage battery, as an example. In this implementation, the energy supply device 106 may as an example still supply power for transmission of the control signal to the control signal receiving unit 124.

In another example, the control system 100 may include a plurality of control apparatus 102. As an example, the plurality of control apparatus 102 may be configured to control a plurality of different electronic devices 114 of a vehicle. As a further example, a plurality of control apparatus 102 configured to actuate different electronic devices 114 may be attached to a surface (not shown) of a vehicle or may be in the form of a mobile device. The plurality of control apparatus 102 may, in an implementation, be formed together as a unitary control apparatus (not shown) facilitating user selection from among the plurality of control apparatus to be actuated at a given time by operation of the control apparatus 102. In another example, the control apparatus 102 may include an incrementer (not shown) enabling operation of the control apparatus 102 for selection of a value from among a range of values such as a sound volume level or a radio receiver frequency. In another example, the incrementer may include first and second control apparatus 102 combined together to select a value for a control parameter of an electronic device 114 over a range.

Figure 2:
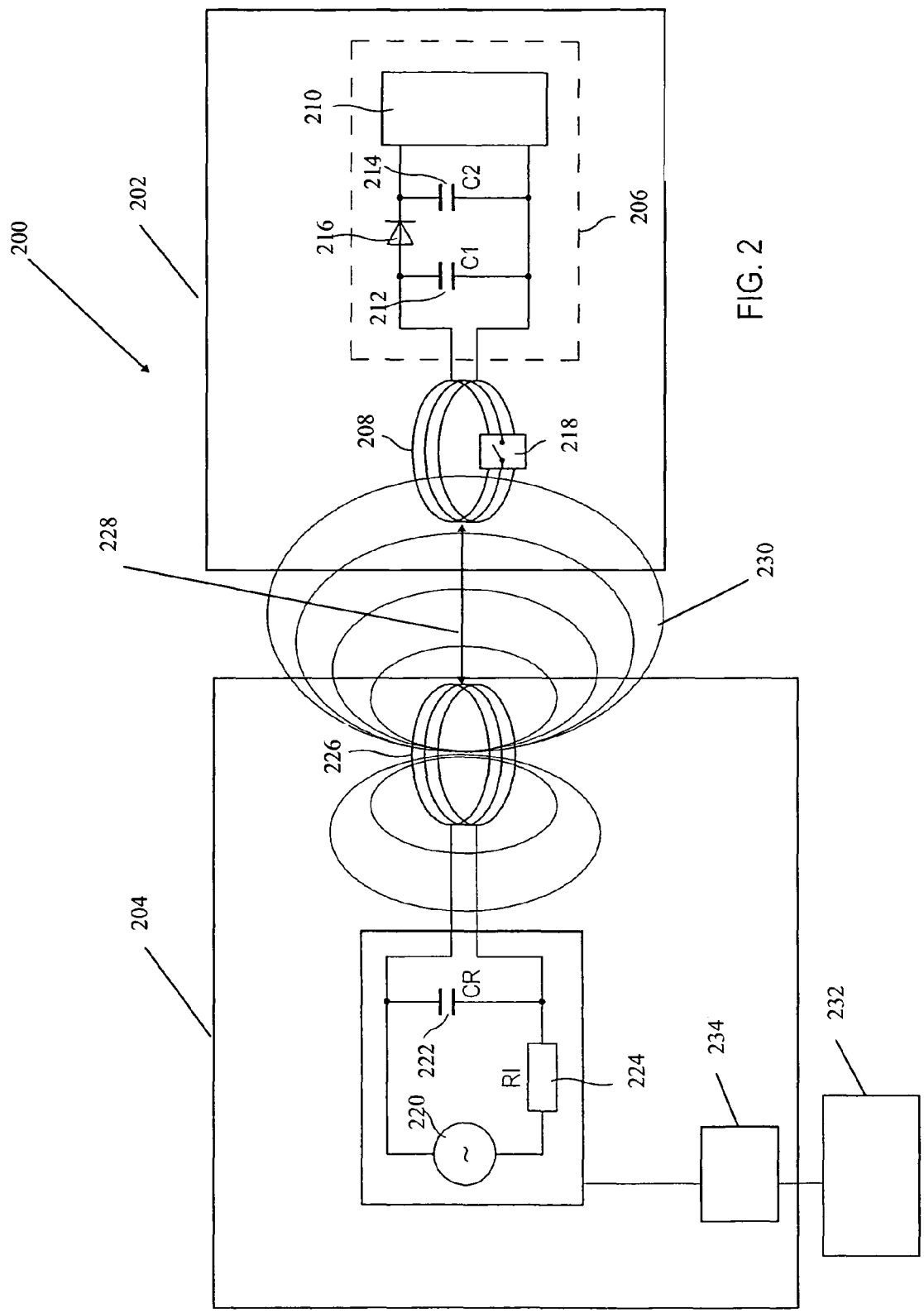
FIG. 2 is a schematic block diagram showing another example of an implementation of a control system.

FIG. 2 is a schematic block diagram showing another example of an implementation of a control system 200. The control system 200 includes a control apparatus 202 and a processing and energy supply device 204.

The control apparatus 202 may include an inductively coupled transponder 206 and an antenna coil 208. In one example of an implementation, the transponder 206 and the antenna coil 208 may be integrated and mounted on a substrate such as a thin film substrate. The transponder 206 may have an electrical circuit including an electronic data-carrying device 210, a first capacitor 212, a second capacitor 214, and a diode 216. In an example, the electronic data-carrying device 210 may be a microchip, such as an electrically erasable programmable read only memory ("EEPROM") or a ferroelectric random access memory ("FRAM") memory device. In another example, a plurality of electronic data-carrying devices (not shown), connected in the electrical circuit of the transponder 206, may be provided instead of the single electronic data-carrying device 210. As an example, the antenna coil 208 may be a large area coil.

In one example of an implementation, the antenna coil 208 may incorporate a switch 218 configured as an enabler-disabler for the electrical circuit of the transponder 206. As an example, operation of the switch 218 may open and close a loop of the antenna coil 208. As an example, the switch 218 may be implemented as a membrane key (not shown) operable by finger contact with the key membrane.

In one example of an implementation, the transponder 206 may be a passive transponder without an internal power supply. As an example, the transponder 206 may be an RFID. A control apparatus 202 may be fabricated, as an example, by mounting a switch 218 such as a user-operable membrane key on the RFID antenna for interrupting a section of the antenna coil 208. In an example, the overall control apparatus 202 may not include an internal power supply, as the processing and energy supply device 204 may supply needed power. Accordingly, the control apparatus 202 may not require a storage battery for example, which accordingly reduces the resultant minimum weight and size of the control apparatus 202.

As an example, the transponder 206 to be included in the control system 200 may be selected in the same manner as discussed earlier with regard to the transponder 108, in dependence on the maximum expected distance at which the control apparatus 202 and the processing and energy supply device 204 may be separated from each other during utilization.

The processing and energy supply device 204 may have an electrical circuit including a power supply 220, a capacitor 222, a resistor 224, and an antenna coil 226. The capacitor 222 may be connected in the electrical circuit in parallel with the antenna coil 226. The antenna coil 226 of the processing and energy supply device 204 may be separated from the antenna coil 208 of the control apparatus 202 by a distance represented by the arrow 228. The capacitance of the capacitor 222 may be selected such that the capacitor 222 forms a parallel resonant circuit with the antenna coil 226 taking advantage of resonant inductance of the antenna coil 226 and having a resonant frequency that corresponds with a transmission frequency of the processing and energy supply device 204. Very high currents may be generated in the antenna coil 226 by resonance step-up in this parallel resonance circuit. These high currents in the antenna coil 226 may generate a high frequency electromagnetic field schematically indicated by field lines 230. In one example of an implementation, the electromagnetic field generated by the antenna coil 226 may be sufficiently strong to reach the antenna coil 208 of the control apparatus 202, in spite of the distance indicated by the arrow 228 between the antenna coils 208 and 226. The antenna coil 208 and the capacitor 212 of the control apparatus 202 may form an additional resonant circuit tuned to the transmission frequency of the processing and energy supply device 204. When the electromagnetic field emitted by the antenna coil 226 reaches the antenna coil 208, a voltage is inductively generated in the antenna coil 208. The voltage at the antenna coil 208 reaches a maximum, due to resonance step-up in the parallel resonant circuit in the processing and energy supply device 204. The voltage thus generated in the antenna coil 208 may be rectified by the electrical circuit of the transponder 206 earlier discussed, and may then serve as a power supply for the electronic data-carrying device 210. The electronic data-carrying device 210 may store data for control of an electronic device 232 to be controlled.

When the switch 218 is in enabled mode, a signal may be received by the antenna coil 208 from the antenna coil 226. A control signal may then be generated in the transponder 206 and inductively transmitted as an electromagnetic field from the antenna coil 208 to the antenna coil 226. When this electromagnetic field reaches the antenna coil 226, an electric current constituting a control signal is generated in the electrical circuit of the processing and energy supply device 204. In one example of an implementation of the remote control system, the response signal may be transmitted via a Bluetooth® format (Bluetooth® is a registered trademark of Bluetooth Sig, Inc.) or other format utilized to transmitting signals, such a RF. This control signal may activate a control unit 234 interposed in an electrical circuit between the processing and energy supply device 204 and an electronic device 232 to be controlled. The control signal may then control a parameter of user-activatable operation of the electronic device 232 to be controlled.

In another example of an implementation, the transponder 206 may be an active transponder having an internal power supply source (not shown) for voltage supply of the electronic data-carrying device 210. Inclusion of the internal power supply source may result in a small increase in size of the control apparatus 202. The internal power supply source may be a storage battery, as an example. In an implementation, the antenna coil 208 may still supply power for transmission of the control signal to the antenna coil 226.

In another example of an implementation, the control system 100 or 200 may be reconfigured (not shown) for electrical coupling instead of inductive coupling. In such a reconfigured control system 100 or 200, an external energy supply device may generate a high-frequency electrical field. The antenna of the external energy supply device for such a control system 100 or 200 may include a large electrically conductive area. As examples, the antenna may be an electrode in the form of a metal foil or a metal plate. When a high-frequency voltage is applied to the electrode, a high-frequency electric field forms between the electrode and the earth potential (ground). The high-frequency voltages may be, as an example, within a range of between about a few hundred volts and about a few thousand volts. Such voltages may be generated in the external energy supply device by a voltage rise in a resonance circuit. The resonance circuit may include a coil in the external energy supply device, an internal capacitor configured in parallel with such a coil, and the capacitance between the electrode and the earth potential. The resonant frequency of the resonance circuit corresponds with the transmission frequency of the external energy supply device. The antenna for the transponder in either of these reconfigured control system 100, 200 may include two conductive electrode surfaces lying in a plane. When the transponder is placed within the electrical field of the external energy supply device, then an electric voltage rises between two transponder electrodes. This electric voltage may be used to supply power to the transponder chip.

In further examples, the control system 100 or 200 may be reconfigured (not shown) for surface acoustic coupling or electromagnetic backscattering coupling.

In another example, a mode of data transfer between the control apparatus (102, 202) and the processing device (104, 204) within the control system 100 or 200, respectively, may take place, as examples, according to full duplex (FDX) or half duplex (HDX) group procedures, or sequential procedures (SEQ).

Figure 3:
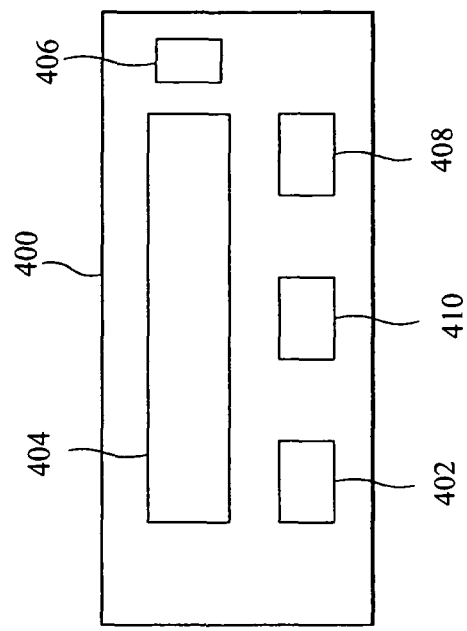
FIG. 3 is illustrates a block diagram showing a control system mounted on the steering wheel of a vehicle.

FIG. 3 is a schematic block diagram showing a control device or apparatus 304 mounted to a steering wheel 306 in the passenger compartment of a vehicle. A control device 304 may include a transponder (not shown) and an input device (not shown) on a steering wheel 306, for operation by a vehicle driver. As another example, the control apparatus 304 may be provided (not shown) on a vehicle dashboard, or attached to an on-board entertainment system, on a vehicle headliner, on a vehicle console, or together with another type of user-machine-interface. The control device 304 may be integrated with any such devices, may be removeably affixed to such device or may be a separate mobile component in the vehicle.

The input device may include disabling and enabling units constituted by a membrane key (not shown). Unless the driver operates the membrane key, a control signal transmission unit of the transponder in the control apparatus 304 may be inactive, as the membrane key may be in the disabling mode. When the driver applies pressure to the membrane key, the membrane key may place the control apparatus 304 in enabling mode, forming an electrical connection in the input device.

Figure 4:
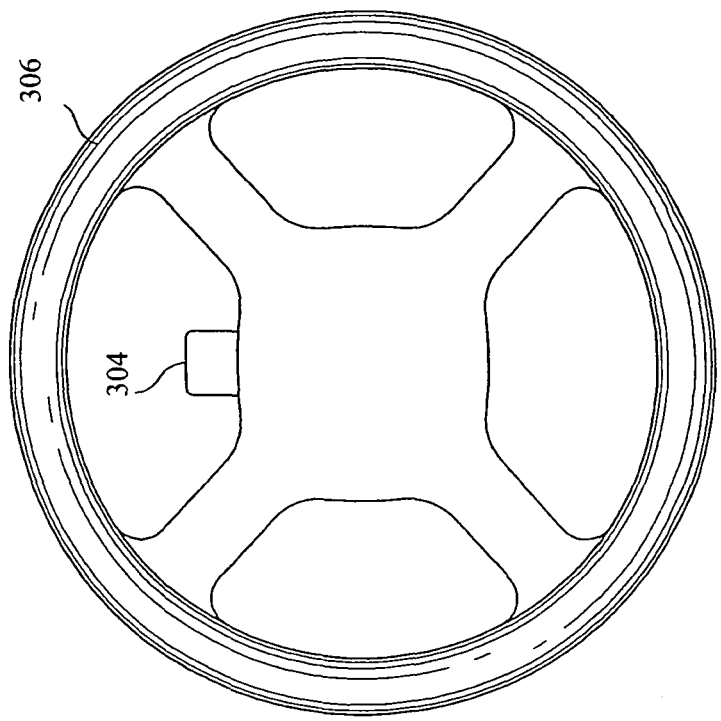
FIG. 4 is a schematic block diagram showing a vehicle navigation system that may be controlled by the control system illustrated in FIG. 3.

FIG. 4 is a schematic block diagram showing a vehicle navigation system 400 that may be controlled by the control system illustrated in FIG. 3. Once the control apparatus 304 (FIG. 3) in placed in enabling mode, the input device may cause the control signal transmission unit of the transponder to transmit a control signal to a control signal receiving unit 402. The control signal receiving unit 402 may be integrated into the navigation system 400 including a navigation unit 404. The control signal receiving unit 402 may communicate the control signal to a control unit 406, which may then communicate a control signal to an electronic vehicular navigation device in the navigation unit 404 or to an electronic vehicular non-navigation device. In one example of an implementation, an energy supply device 408 may also be integrated into the navigation system 400. An antenna coil (not shown) of the energy supply device 408 may generate a strong high frequency electromagnetic field which may reach an antenna coil of the transponder in the control apparatus 304. The control apparatus 304 may be located at a distance within a range of between about 10 centimeters ("cm") and about 80 cm away from the energy supply device 408. As a further example, the navigation system 400 may include an activation signal transmission unit 410. The activation signal transmission unit 410 may communicate an activation signal to a signal receiving unit (not shown) integrated in the transponder of the control apparatus 304. A control signal may then be generated in the transponder in the control apparatus 304 and inductively transmitted as an electromagnetic field to the control signal receiving unit 308 in the navigation system 302. The power supply for the navigation system 400 may include the energy supply device 408, the activation signal transmission unit 410, the control signal receiving unit 402, the navigation unit 400, and the control unit 406 may, as an example, be activated upon start of the vehicle by operating the ignition switch by the driver.

In another example, a plurality of control apparatus 304 may be part of the control system. The plurality of control apparatus 304 may be configured to control the operations of a plurality of different electronic vehicular navigation devices in the navigation unit 400, or separate from the navigation unit 400. In another implementation, one or more control apparatus 304 may be included in the control system and configured to control the operation of electronic vehicular devices some or all of which may be electronic vehicular non-navigation devices not part of the navigation system 400. As a further example, a plurality of control apparatus 304 configured to actuate different user-actuatable electronic vehicular devices may be attached to the steering wheel 306 or to another surface (not shown) of a vehicle. The plurality of control apparatus 304 may, in an implementation, be formed together as a unitary control apparatus (not shown) facilitating user selection from among the plurality of control apparatus to be actuated at a given time by operation of the control apparatus 304. In another example, the control apparatus 304 may include an incrementer (not shown) enabling operation of the control apparatus 304 for selection of a value from among a range of values such as a sound volume level or a radio receiver frequency. In an implementation, the incrementer may include two control apparatus 304 combined together and configured to select a value for a control parameter of the navigation system 400 over a range.

Figure 5:
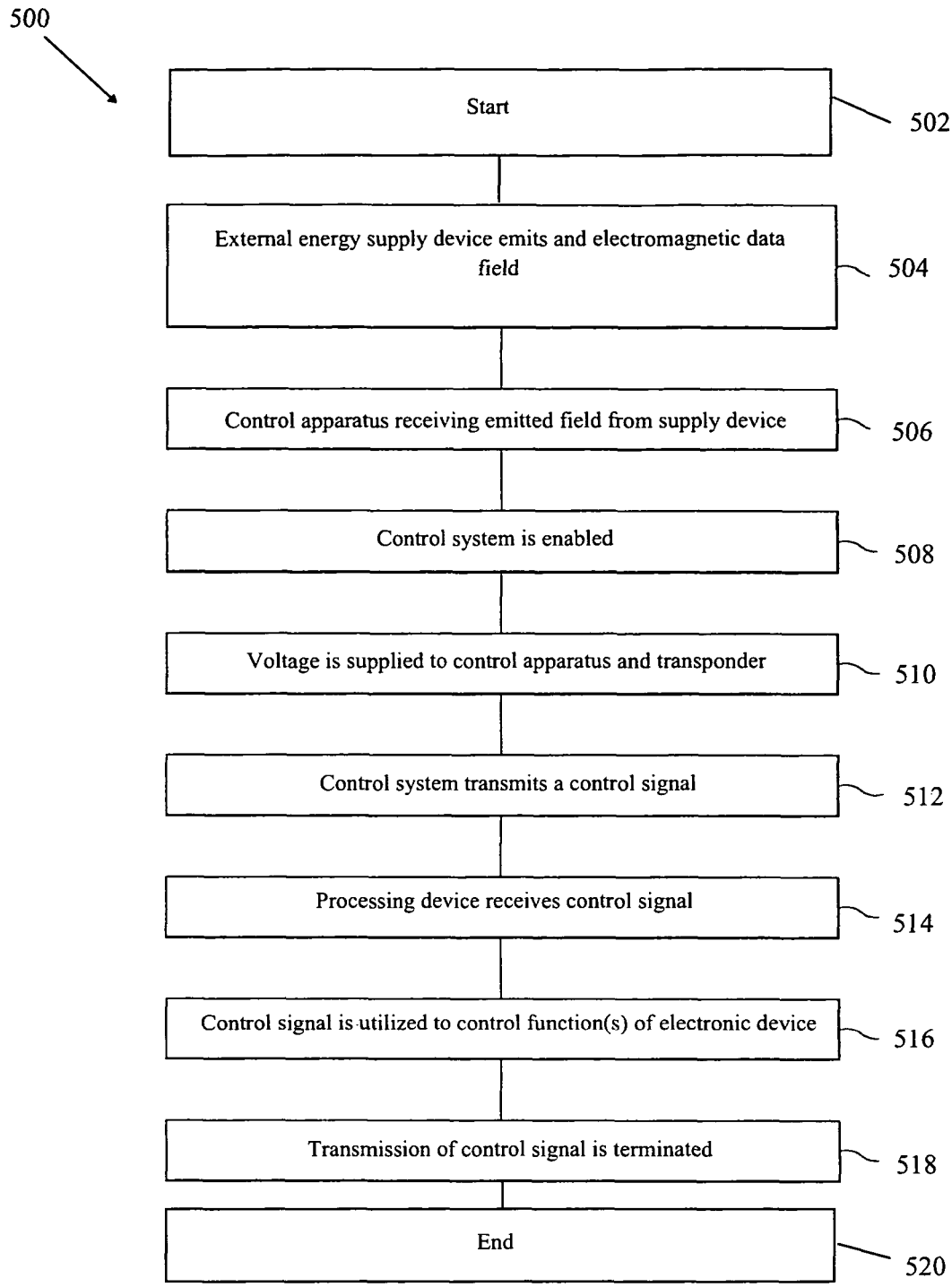
FIG. 5 is a flow chart showing one example of a method of operation of a control system that may control, for example, a vehicular navigation system.

FIG. 5 is a flow chart showing one example of a method of operation 500 of a control system that may control, for example, a vehicular navigation system. The method starts at step 502, and in step 504, an energy supply device may continuously emit an electromagnetic field. In step 506, a control apparatus including a transponder (not shown) and an input device (such as a membrane key, not shown) that may be located on a steering wheel in a vehicle may receive the electromagnetic field emitted by the energy supply device, in step 502. The input device may include disabling and enabling units constituted by a membrane key, and may initially be in a disabled mode. Since the input device is in the disabled mode, no power is supplied to the transponder.

In step 508, a driver or user of the vehicle may operate the membrane key, placing the key in an enabled mode, which may close an electrical circuit in the control apparatus. As a consequence, voltage is supplied at step 510 to a response signal transmission unit in the transponder of the control apparatus. In step 512, the response signal transmission unit in the control apparatus transmits a control signal to a control signal receiving unit in the processing device. In step 514, the processing device receive a control signal. The control signal unit in the processing device may conduct the control signal through an electrical circuit to a control unit. The control unit may be connected by an electrical circuit with the navigation unit or other electronic component.

At step 516, the control unit may send a control signal to the navigation unit for controlling one or more functions of the navigation unit. As examples, the functions of a navigation unit to be controlled by the control apparatus may include unit on-off status, sound volume, backlighting, resume trip, find detour route, silent-voice direction modes, map display vs. route listing modes, radio station or other audio media selection, preset mode value selection, or other functions. In another implementation, the function of the navigation system to be controllable by the control apparatus may be selected by operating a switch located at the navigation system.

In step 518, after the function of the navigation system has been controlled, the driver or other user may terminate transmission of the control signal to the control signal receiving unit by releasing the membrane key. The method ends at step 520.

Persons skilled in the art will understand and appreciate, that one or more processes, sub-processes, or process steps described in connection with FIGS. 1 through 5 may be performed by hardware and/or software. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory (not shown) in the device used to execute the software. The software in software memory may include an ordered listing of executable instructions for implementing logical functions (i.e., "logic" that may be implemented either in digital form such as digital circuitry or source code or optical circuitry or chemical or biochemical in analog form such as analog circuitry or an analog source such an analog electrical, sound or video signal), and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (herein known as a "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer (i.e., machine) data signals embodied in the carrier wave signal. The computer/machine data signals may include data or software that is transported or interacts with the carrier wave signal.

While various embodiments of the invention have been described, it will be apparent to those of ordinary skill in the art that many more embodiments and implementations are possible within the scope of this invention. Accordingly, the invention is not to be restricted except in light of the attached claims and their equivalents. While aspects of control system have been described above for utilization in controlling a navigation system mounted in a vehicle, any other electronic device or component of a vehicle may be controlled by such apparatus. The control system may be utilized in analogous manners for controlling electronic devices and components of a vehicle having functions, as examples, that are related to obtaining, retrieving, storing and displaying information, presenting entertainment or infotainment, vehicle diagnostics, climate control, and driving operation of the vehicle itself. Furthermore, while aspects of control system have been described above for utilization in controlling an electronic device mounted in a vehicle, any other electronic device that is not mounted in a vehicle may likewise be controlled by such apparatus. The control system may be utilized in analogous manners for controlling electronic devices and components that are not mounted in a vehicle and which are related, as examples, to obtaining, retrieving, storing and displaying information, presenting entertainment or infotainment.

What is claimed is:

1. A control system for controlling an electronic device, comprising:
    a control apparatus and a processing device;
    the control apparatus including a transponder and a coupling unit;
    the transponder being configured to receive an activation signal from the processing device and automatically transmit a control signal to the processing device;
    the coupling unit being configured to enable and disable transmission of the control signal, the coupling unit further configured to be inductively coupled with an external energy source, and supply voltage inductively generated from the external energy source to at least the transponder, the coupling unit comprising a switch configured to selectively enable wireless supply of power; and
    the processing device being configured to receive the control signal and transmit the control signal to the electronic device.

2. The control system of claim 1, where the transponder includes an antenna configured as a signal receiving unit and as a response signal transmission unit.

3. The control system of claim 2, where the coupling unit is configured to enable and disable the response signal transmission unit using the switch.

4. The control system of claim 2, where the processing device includes an activation signal transmission unit, configured to transmit the activation signal to the signal receiving unit.

5. The control system of claim 1, where the processing device includes a control signal receiving unit.

6. The control system of claim 5, where the processing device includes a control unit configured to receive the control signal from the control signal receiving unit and transmit the control signal to the electronic device.

7. The control system of claim 1, where the processing device includes an activation signal transmission unit, configured to transmit the activation signal to the transponder.

8. The control system of claim 1, where the external energy source is an energy supply device configured to wirelessly supply energy to the transponder.

9. The control system of claim 1, where the processing device includes the external energy source as an energy supply device configured to supply energy to the transponder.

10. The control system of claim 9, where the energy supply device is configured to generate an electromagnetic field that supplies radiation energy to the transponder.

11. The control system of claim 9, where the transponder includes an antenna and is configured as a signal receiving unit and as a response signal transmission unit; and the processing device includes an activation signal transmission unit integrated with the energy supply device and configured to wirelessly transmit the activation signal to the signal receiving unit and wirelessly supply energy to the transponder via the antenna.

12. The control system of claim 1, further including a plurality of control apparatus.

13. The control system of claim 12, where at least two control apparatus are configured as an incrementor for selecting values, over a range, for a control parameter of the electronic device.

14. The control system of claim 1, where the processing device is configured to receive the control signal and communicate the control signal to an electronic vehicular navigation device.

15. The control system of claim 14, where the processing device is integrated with the electronic vehicular navigation device.

16. The control system of claim 1, where the processing device is configured to receive the control signal and transmit the control signal to an electronic vehicular non-navigational device.

17. The control system of claim 1, further comprising an antenna which is a coil antenna, and the processing device includes an antenna to inductively coupled with the coil antenna, the antenna of the processing device configured to receive current from the energy supply device and induce a voltage in the coil antenna.

18. A control apparatus for wireless transmission of a control signal to a processing device for controlling a remote electronic device, said control apparatus comprising:
    a transponder having a signal receiving unit for receiving an activation signal from the processing device and a signal transmission unit for automatically transmitting a control signal to the processing device in response to the received activation signal;
    a disabling unit for disabling signal transmission by the signal transmission unit and an enabling unit for enabling signal transmission by the signal transmission unit; and
    a coupling unit configured to be inductively coupled to an external energy supply source and supply inductively generated power to the control apparatus, where the disabling unit and the enabling unit comprise a switch selectively switchable to enable wireless supply of power.

19. The control apparatus of claim 18, where the switch is configured to be operated in response to a signal created by a user.

20. The control apparatus of claim 18, where the coupling unit is configured to be electrically coupled to the external energy supply source.

21. The control apparatus of claim 18, where the switch is operable in response to a signal generated with a membrane key.

22. The control apparatus of claim 18, where the transponder includes at least one microchip mounted on a thin substrate on which control data relating to the control signal is stored.

23. The control apparatus of claim 22, where the control data includes data relating to different parameters of the functions of the electronic device to be controlled.

24. The control apparatus of claim 18, where the control apparatus is configured to be mountable on a steering wheel of a vehicle.

25. The control apparatus of claim 18, where the transponder comprises a large-area coil for inductive coupling, arranged on a thin film substrate.

26. The control apparatus of claim 18, where the transponder is a passive transponder without an internal power supply.

27. The control apparatus of claim 18, where the transponder is an active transponder having a microchip and an internal power supply source for voltage supply of said microchip.

28. The control apparatus of claim 18, further comprising an antenna coil, and the switch is switchable to open and close a loop of the antenna coil to disable and enable, respectively, signal transmission and supply of inductively generated power to the transponder, the switch switchable in response to operation by a user.

29. A method for controlling an electronic device utilizing a control apparatus having a transponder, the method comprising:
    powering the control apparatus wirelessly by inductive coupling with an external power source via an antenna included in the control apparatus;
    enabling the control apparatus to transmit a control signal wirelessly via the antenna;
    transmitting the control signal to the electronic device via the antenna utilizing the transponder; and
    terminating both the transmission of the control signal and wireless powering of the control apparatus using a switch included in the control apparatus.

30. The method of claim 29, further including enabling the control apparatus using a coupling unit.

31. The method of claim 29, further including enabling the control apparatus using the switch.

32. The method of claim 29, further including receiving with the antenna an electromagnetic field supplied as radiation energy from the external power source to power the control apparatus.

33. The method of claim 29, further including powering the control apparatus utilizing an internal power source.

34. The method of claim 29, where enabling the control apparatus comprises receiving an activation signal with the transponder, the control apparatus powering the control apparatus and enabling the control apparatus to transmit the control signal in response to the activation signal.

35. The method of claim 29, where transmitting the control signal to the electronic device comprises the transponder wirelessly transmitting the control signal via the antenna to a processing device positioned away from the control apparatus, the processing device configured to communicate the control signal to the electronic device to control a function present in the electronic device.

36. The method of claim 35, where the external power source is included in the processing device, and the antenna is an antenna coil configured to include the switch to open and close a loop of the antenna coil.

\* \* \* \* \*